US008990480B2

(12) United States Patent
Kanno et al.

(10) Patent No.: US 8,990,480 B2
(45) Date of Patent: Mar. 24, 2015

(54) SEMICONDUCTOR MEMORY DEVICE AND COMPUTER PROGRAM PRODUCT (75) Inventors: Shinichi Kanno, Tokyo (JP); Kazuhiro Fukutomi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 243 days.

(21) Appl. No.: 13/586,219

(22) Filed: Aug. 15, 2012

(65) Prior Publication Data
US 2013/0246688 A1    Sep. 19, 2013

(30) Foreign Application Priority Data

Mar. 15, 2012   (JP) ................................. 2012-058768

(51) Int. Cl.
G06F 12/00     (2006.01)
G11C 16/10     (2006.01)
G06F 12/02     (2006.01)

(52) U.S. Cl.
CPC .... *G06F 12/0246* (2013.01); *G06F 2212/7205* (2013.01)
USPC .................... 711/103; 711/154; 711/E12.008

(58) Field of Classification Search
None
See application file for complete search history.

(56) References Cited

U.S. PATENT DOCUMENTS

| 5,555,371 | A   * | 9/1996  | Duyanovich et al. ........... 714/13 |
| 5,860,082 | A   * | 1/1999  | Smith et al. .................... 711/103 |
| 2006/0026211 | A1 * | 2/2006 | Potteiger ....................... 711/103 |
| 2008/0282023 | A1 * | 11/2008 | Biswas et al. ................. 711/103 |
| 2008/0282024 | A1 * | 11/2008 | Biswas et al. ................. 711/103 |
| 2012/0284587 | A1 * | 11/2012 | Yu et al. ........................ 711/103 |
| 2013/0067289 | A1 * | 3/2013 | Maislos et al. ............... 711/103 |

FOREIGN PATENT DOCUMENTS

| JP | 63-137335 A    | 6/1988  |
| JP | 8-255110 A     | 10/1996 |
| JP | 2001-318829 A  | 11/2001 |
| JP | 2009-211220    | 9/2009  |
| JP | 2010-146469    | 7/2010  |
| JP | 2010-218290    | 9/2010  |
| JP | 2011-192260    | 9/2011  |
| JP | 2011-197945    | 10/2011 |

(Continued)

OTHER PUBLICATIONS

Brendan Gregg, "ZFS L2ARC", http://blogs.oracle.com/brendan/entry/test, Jul. 22, 2008, 9 pages.

(Continued)

*Primary Examiner* — Daniel J Bernard
(74) *Attorney, Agent, or Firm* — Oblon, McClelland, Maier & Neustadt, L.L.P.

(57) ABSTRACT

According an embodiment, a semiconductor memory device includes a semiconductor memory chip to store plural pieces of data that are written and read in units of a page and are erased in units of a block including plural pages; a discarding unit to discard, after the data is written in the semiconductor memory chip with a logic address being designated, at least a portion of valid data among the plural pieces of data; a compaction unit to write the valid data excluding the discarded data in a second block among the valid data stored in a first block and erase the first block; and a controller to output, in response to a request for reading the discarded data, a response indicating that the data is unable to be read. When all the valid data included in a block are discarded, the discarding unit erases the block.

20 Claims, 7 Drawing Sheets

(56) References Cited

FOREIGN PATENT DOCUMENTS

| | | |
|---|---|---|
| JP | 2012-68863 | 4/2012 |
| JP | 2012-68986 | 4/2012 |

OTHER PUBLICATIONS

Office Action issued on Jun. 17, 2014 in the corresponding Japanese Patent Application No. 2012-058768 (with English Translation).

* cited by examiner

SEMICONDUCTOR MEMORY DEVICE AND COMPUTER PROGRAM PRODUCT

CROSS-REFERENCE TO RELATED APPLICATIONS

This application is based upon and claims the benefit of priority from Japanese Patent Application No. 2012-058768, filed on Mar. 15, 2012; the entire contents of which are incorporated herein by reference.

FIELD

Embodiments described herein relate generally to a semiconductor memory device and a computer program product.

BACKGROUND

Techniques of using an SSD (solid state drive) as a cache of a file system have been known. In the SSD, for example, NAND type semiconductor memory devices (NAND memories) or the like are used. In the case where a storage device is configured by using a semiconductor memory such as a NAND memory, transfer process (compaction or garbage collection) is performed.

For example, an SSD using NAND memories is used as a cache of a HDD (hard disk drive), so that it is possible to implement a high speed in comparison with the case where a cache is not used. However, in the NAND memory, since the aforementioned transfer process (compaction or garbage collection) which generally has a large processing load is needed, high speed implementation may be prevented.

DETAILED DESCRIPTION

According to an embodiment, a semiconductor memory device includes a semiconductor memory chip configured to store therein a plurality of pieces of data that are written and read in units of a page, which is a storage area having a predetermined size, and that are erased in units of a block including a plurality of the pages; a discarding unit configured to, after the data is written in the semiconductor memory chip with a logic address being designated, discard at least a portion of valid data, which is data finally written in the same logic address, among the plurality of pieces of data; a compaction unit configured to write the valid data excluding the data discarded by the discarding unit in a second block among the valid data stored in a first block and erase the first block; and a controller configured to output, in response to a request for reading the discarded data, a response indicating that the data is unable to be read. In the case where all the valid data included in a block are discarded, the discarding unit erases the block.

Various embodiments will be described hereinafter with reference to the accompanying drawings.

A semiconductor memory device according to an embodiment discards data stored in a NAND memory when a predetermined condition is satisfied. For example, the condition as to whether or not data is discarded is determined based on whether to be a high compaction cost. Since the area where the discarded data was stored becomes writable, it is possible to suppress a processing amount of compaction and to secure a writable area. Alternatively, the area which is writable according to only a discarding process without execution of compaction may be secured. In addition, data discarding denotes that, for example, although access is requested with respect to data, the data is not allowed to be accessed.

Figure 1:
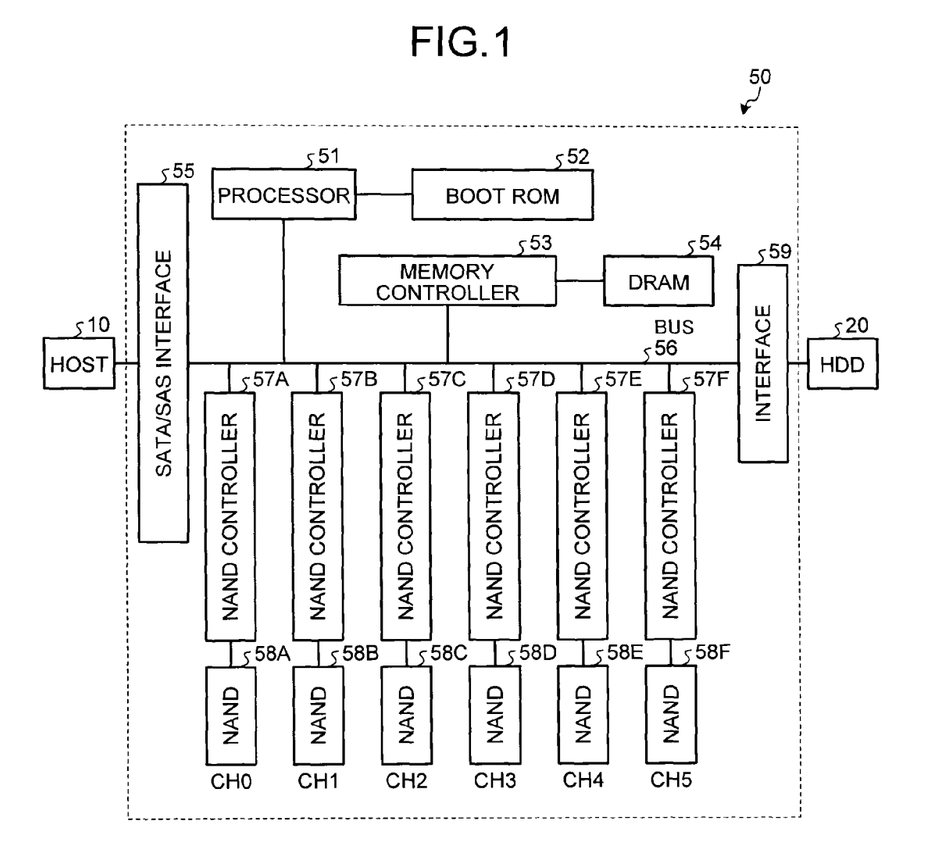
FIG. 1 is a diagram illustrating a hardware configuration of a semiconductor memory device according to an embodiment.

First, a hardware configuration of the semiconductor memory device according to the embodiment will be described with reference to FIG. 1. A semiconductor memory device 50 includes a processor 51, a Boot ROM (Read Only Memory) 52, a SATA/SAS interface 55, a memory controller 53, a DRAM (Dynamic Random Access Memory) 54, NAND controllers 57A to 57F, NANDs 58A to 58F which are semiconductor memory devices, an interface 59, and a bus 56 connecting these components. In the case where there is no need to distinguish the NAND controllers 57A to 57F, these controllers may be simply referred to as a NAND controller 57. In addition, in the case where there is no need to distinguish the NANDs 58A to 58F, these NANDs may be referred to as a NAND 58.

The SATA/SAS interface 55 controls communication with a host 10, which is an upper level device of the semiconductor memory device 50, under the control of the processor 51. The interface 59 controls communication with an HDD 20 under the control of the processor 51. The Boot ROM 52 stores therein a program which is executed at the time of power on. Various system programs are stored in the NAND 58.

The processor 51 reads a program from the Boot ROM 52 to execute the program at the time of power on and transmits various system programs stored in the NAND 58 to the DRAM 54 according to the program. The processor 51 executes the system programs on the DRAM 54 to control the semiconductor memory device 50 overall to realize various functions. More specifically, the processor 51 interprets a command transmitted from the host 10 through the SATA/SAS interface 55. The processor 51 controls writing data in the NAND 58 or reading data from the NAND 58 according to the interpreted command.

The memory controller 53 controls the DRAM 54. The DRAM 54 stores therein various types of data or various programs. In the embodiment, the DRAM 54 stores therein a lookup table and a bit vector table which are described later. The NAND controller 57 controls the NAND 58. The NAND controller 57 may include an error correction circuit.

The NAND 58 is a storage device which corresponds to a semiconductor memory chip and is used as, for example, a NAND type flash memory. The NAND 58 cannot perform reading and writing at random but it can perform reading and writing in units of a so-called page. A plurality of pages are united to constitute a storage area in units of a so-called block.

Herein, one page has a size of 4 KB, and 64 pages constitute one block. The page size and the number of pages in one block are not limited thereto.

One NAND 58 is configured with a plurality of blocks in a collective manner. In addition, in the embodiment, as illustrated in FIG. 1, the number of NANDs 58 is set to 6. The number of NANDs 58 is not limited to 6. One channel (CH0 to CH5) is allocated to each of the NANDs 58A to 58F. In addition, in the case where data requested to be written by the host 10 is larger than the page size, the semiconductor memory device 50 divides the data into a plurality of pieces of data in units of a page, allocates each piece of the data divided in units of a page (referred to as division data) to each of the channels CH0 to CH5, and performs writing.

Figure 2:
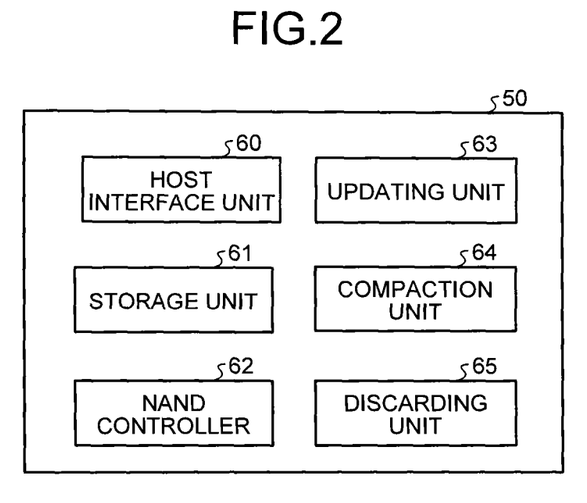
FIG. 2 is a block diagram illustrating functions of the semiconductor memory device according to the embodiment.

Next, functions implemented by the semiconductor memory device 50 are described with reference to FIG. 2. The semiconductor memory device 50 includes the NAND 58, a host interface unit 60, an updating unit 63, a NAND controller 62, a discarding unit 65, a compaction unit 64, and a storage unit 61.

The function of the host interface unit 60 is implemented, for example, by the program execution of the processor 51 and the function of the SATA/SAS interface 55. Each of the functions of the updating unit 63, the compaction unit 64, and the discarding unit 65 is implemented, for example, by the program execution of the processor 51. The function of the NAND controller 62 is implemented, for example, by the program execution of the processor 51 and the function of the NAND controller 57. The storage unit 61 is implemented, for example, by the DRAM 54.

The host interface unit 60 is an interface which controls communication between the host 10 and the semiconductor memory device 50. The host interface unit 60 receives a command transmitted from the host 10.

The storage unit 61 stores therein a lookup table (LBA table) and a bit vector table. The LBA table is a table listing correspondence relation between logic addresses and physical addresses of write target data (data requested to be written). The physical address indicates a physical storage position on the NAND 58 where the write target data is to be written. The LBA table is used to specify the physical address corresponding to the logic address designated by the host 10.

Figure 3:
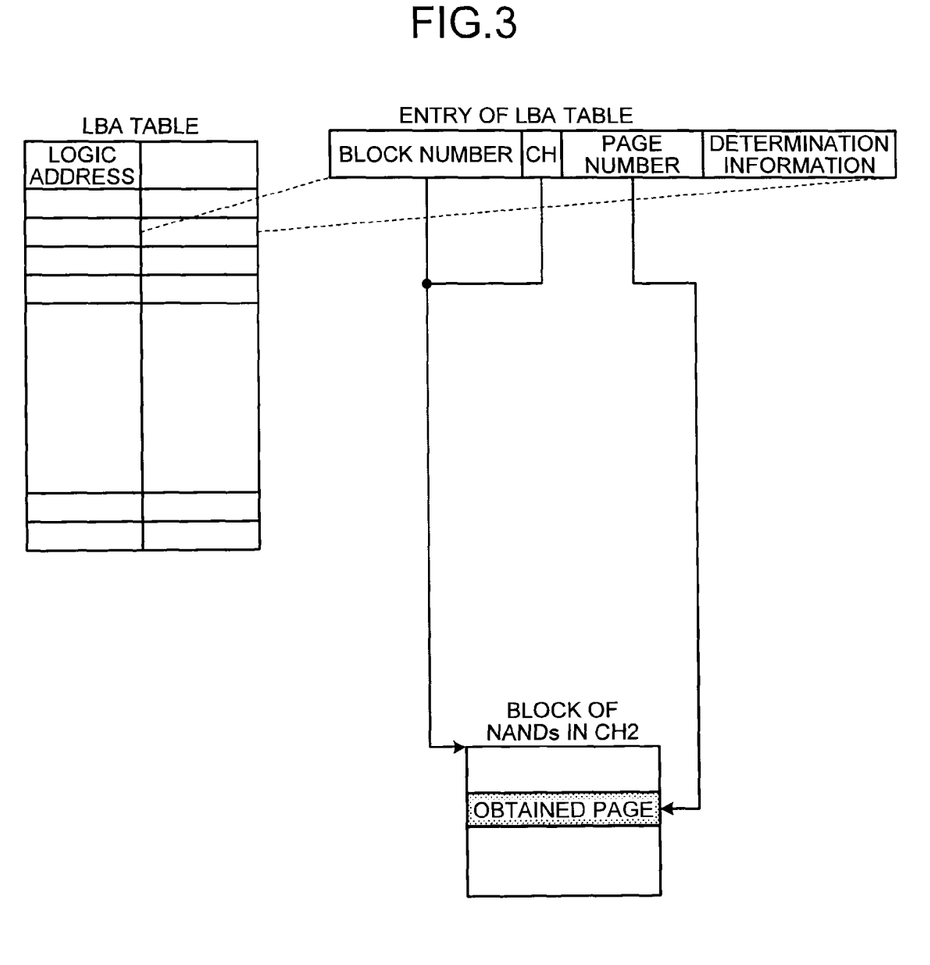
FIG. 3 is a diagram illustrating an example of a data structure of an LBA table according to the embodiment.

FIG. 3 is a diagram illustrating an example of a data structure of the LBA table. As illustrated in FIG. 3, the LBA table includes an entry of a physical address which is associated with a logic address corresponding to an index. The entry includes a block number identifying a block, a channel number (CH), a page number identifying a page, and determination information.

The logic address of the write target data is calculated based on the logic address designated according to the data writing request from the host 10. The block numbers are allocated to the blocks, for example, in the order from the leading block. The channel number indicates which channel the NAND 58 where the block (physical block) storing the data corresponding to the logic address exists is connected to.

The page number indicates which page in the block specified by the block number and the channel number the data corresponding to the logic address is stored in. In addition, the page numbers may be allocated, for example, in the order of the physical addresses, or the physical addresses of the pages may be allocated as the page numbers. The LBA table is updated every time when the write target data is written in the NAND 58.

The determination information indicates whether data stored in a page are discardable or undiscardable. For example, the determination information of "1" indicates that the data of the page are discardable, and the determination information of "0" indicates that the data of the page are undiscardable.

The determination information may be configured so as to be designated when the host 10 requests for writing. For example, a command identifier identifying a command from the host 10 may be used to determine whether or not the write target data is set to be discardable. In addition, information indicating whether or not the writ target data is set to be discardable may be included in a command from the host 10. As described later, in the case of determining whether the data is discardable or undiscardable in a logic address range, the host 10 can designate whether the write target data is set to be discardable or undiscardable according to the logic address which is to be designated at the time of writing.

In addition, besides the method of storing the determination information in the LBA table, any method that can determine whether data stored in a page is discardable or undiscardable may be used. For example, a method can be configured so that the determination information of each page is stored in a table different from the LBA table. In addition, as described with reference to FIG. 4, in the case where the data stored in the logic address included in a partial range (for example, reading area) of the logic address range is set to be discardable, it may be determined whether or not the logic address of the data is included in the partial range.

Figure 4:
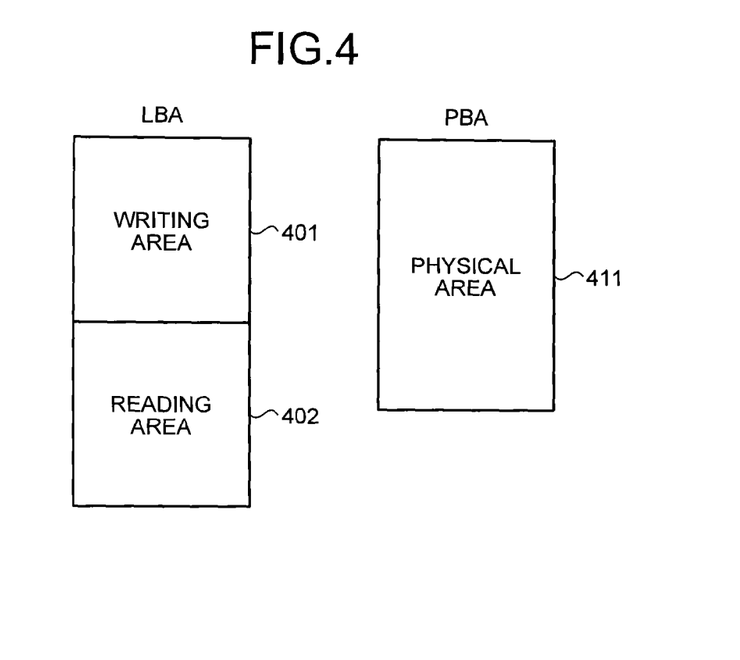
FIG. 4 is a diagram illustrating correspondence between logic addresses and physical addresses according to the embodiment.

FIG. 4 is a diagram illustrating an example of correspondence between the logic addresses and the physical addresses. As illustrated in FIG. 4, the logic address (LBA) includes, for example, a writing area 401 and a reading area 402. The writing area 401 indicates a logic address range where data writing and data reading can be performed. The reading area 402 indicates a logic address range where only the data reading can be performed.

For example, data stored in the logic address included in the writing area 401 may be set to be undiscardable, and data stored in the logic address included in the reading area 402 may be set to be discardable. In the case where an SSD using NAND memories is used as a cache of an HDD, although the data stored in the reading area 402 is discarded, inconsistence with respect to the data in the HDD does not occur. This is because, although the host 10 cannot read the data as a result of discarding, necessary data may be read again from the HDD.

In addition, the entire logic address range may be configured so as to be the reading area 402. In this case, all the data may be set to be discardable, and the determination information may not be stored in the LBA table.

FIG. 4 illustrates an example where the logic address range (writing area 401+reading area 402) is larger than the physical address (PBA) range (physical area 411). In this configuration, if the physical area 411 for the data to be newly written is not empty, some data corresponding to the logic addresses of the reading area 402 may be discarded, so that the physical area 411 can be secured. On the other hand, in order to guarantee the data of the writing area 401, the size of the physical area 411 needs to be equal to or larger than the size of the writing area 401.

Figure 5:
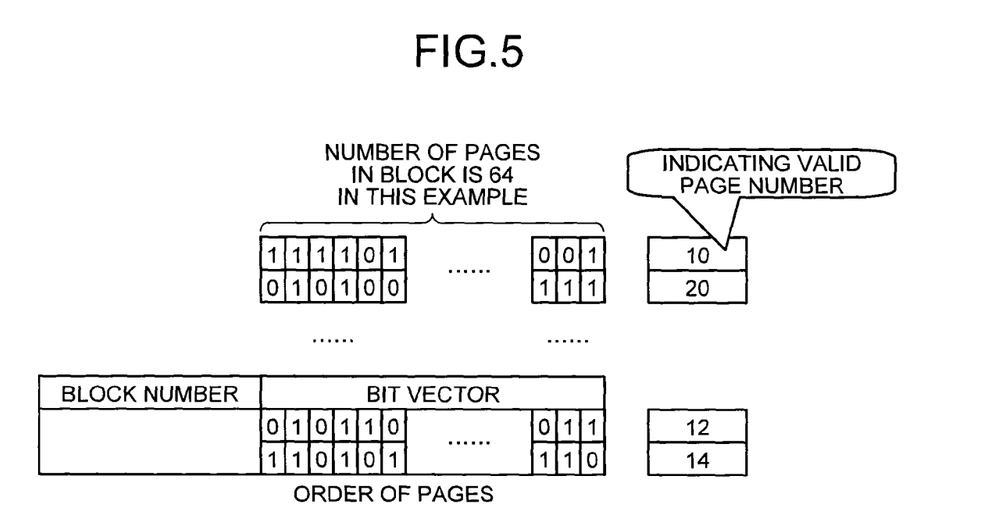
FIG. 5 is a diagram illustrating an example of a configuration of a bit vector table according to the embodiment.

Next, an example of a configuration of the bit vector table is described with reference to FIG. 5. The bit vector table is a table indicating pages (referred to as valid pages) where valid data are written among the pages, which are included in each of the blocks of each channel, in the order of pages as binary values. The binary value for each page is referred to as a bit vector. The value "1" of the bit vector indicates that the page is a valid page, and the value "0" indicates the page is a page (invalid page) which is not a valid page.

In the initial state, all the values of the bit vectors are "0". In the embodiment, when the number of pages is set to 64 pages per block, the number of corresponding bit vectors is 64 per block. As illustrated in FIG. 5, the bit vector table includes a block number corresponding to an index, a bit vector of each page included in a block identified by the block number, and a counter.

The counter indicates a total number of bit vectors of which the value is "1". A page of which the value of the bit vector is "1" is a valid page. Therefore, the counter indicates the number (hereinafter, referred to as a valid page number counter) of valid pages in a block. In such a configuration, the bit vector table is updated every time when data writing is requested by the host 10.

Returning to FIG. 2, the NAND controller 62 controls data writing and data reading for the NAND 58. The NAND controller 62 receives a command transmitted from, for example, the host 10 and accesses the corresponding NAND 58 according to the command. More specifically, in the case where data writing is requested, the NAND controller 62 writes the write target data in the NAND 58.

In the writing, the NAND controller 62 sets a write pointer so as to sequentially indicate writing positions of pages where data is not yet written, in erased blocks in the corresponding NAND 58. The erasing of the block denotes that the values of all the bits constituting the block are set to, for example, "1". The NAND controller 62 writes write target data in the page of the position indicated by the write pointer. Thereafter, the NAND controller 62 updates the write pointer so as to indicate a position of a new page. Therefore, the value of the write pointer is changed so as to sequentially indicate the next writing positions. For example, in the case where a block is identified by a physical address of 15 bits in each channel, and 64 pages are included in one block, the write pointer is configured with a total of 15+6=21 bits.

Now, an example of a data structure of the write target data is described. The NAND controller 62 adds an error correction code (referred to as a page ECC) for detecting an error of the write target data and correcting the error and the logic address designated by a write command (a command of requesting to write data designated with the logic address) to the write target data. In addition, it is assumed that the page ECC includes a code such as a CRC code for detecting an error of data and a code such as an ECC code for correcting the error of the data. In the case where an error of data cannot be corrected by the ECC code, there is a problem in that erroneous correction may be performed. In order to avoid this problem, the CRC code is also included in the page ECC.

The NAND controller 62 writes the write target data, to which the page ECC and the logic address are added, in a page in the NAND 58 indicated by the write pointer. Although the write target data has a size of a page unit, the page size of the NAND 58 corresponds to a total size obtained by adding the page ECC and the logic address to the write target data. In addition, the logic address of each of the division data is calculated by the NAND controller 62 based on the logic address designated by a write command.

In the case where reading of the data (valid data) of the valid page designated with the physical address is requested, the NAND controller 62 reads the data which are written in the page corresponding to the physical address in the NAND 58 by using the physical address.

The NAND controller 62 stores the discardable data and the undiscardable data in the NAND 58 in such a manner that the discardable data and the undiscardable data are distinguished from each other. For example, for the data designated as the discardable data by the command identifier or the like, the NAND controller 62 stores the entry of the LBA table including the determination information indicating that the data is discardable. In addition, for example, the NAND controller 62 stores the data designated as discardable data by the command identifier or the like in the logic address included in the reading area 402.

In addition, after the data is discarded by the discarding unit 65, when reading of the discarded data is requested, the NAND controller 62 outputs a response indicating that reading of the requested data cannot be performed through the host interface unit 60 to a requestor (host 10).

The updating unit 63 updates the LBA table and the bit vector table in response to the data writing or the like. For example, when a write command is received from the host 10, the updating unit 63 refers to the LBA table, updates the bit vector table, and then updates the LBA table.

More specifically, first, the updating unit 63 searches for the physical address corresponding to the logic address with reference to the LBA table. In other words, the updating unit 63 searches for which block the data corresponding to the logic address is written in a page thereof. In the case where the physical address corresponding to the logic address is not stored in the LBA table, the writing of the data corresponding to the logic address is not performed until this time. In this case, the updating unit 63 sets the value of the bit vector corresponding to the page, in which the data corresponding to the logic address is to be written, to "1". The page in which the data is to be written is indicated by the write pointer. In addition, the updating unit 63 increments the value of the valid page number counter corresponding to the block including the page by 1.

On the other hand, when the updating unit 63 refers to the LBA table, if the physical address corresponding to the logic address is stored in the LBA table, it is considered that the writing of the data corresponding to the logic address is performed previously. In this case, the previously written data needs to be invalidated by a current write command. Therefore, the updating unit 63 sets the value of the bit vector corresponding to the page of the physical address stored in the entry of the LBA table, which is referred to by using the logic address designated by the write command, to "0". The updating unit 63 decrements the value of the valid page number counter of the block in which the page exists by 1. In addition, the updating unit 63 sets the value of the bit vector corresponding to the page in which the write target data is to be written to "1," and increments the value of the valid page number counter of the block in which the page exists by 1.

In this manner, since the bit vector table and the valid page number counter are updated every time the data is written, the bit vector table and the valid page number counter continuously indicate the positions of the valid pages and the number of the valid pages. Finally, the updating unit 63 records the physical address in which the to-be-written data is to be written, in the entry of the LBA table corresponding to the logic address. In addition, in the case where the compaction is executed, the updating unit 63 updates the physical address of the LBA table with the physical address of the page to which the valid data is moved.

The compaction unit 64 executes compaction. The compaction is a process of collecting the valid data, for example, in the block including invalid data (invalid page), rewriting the valid data in a new free block (unused block) to move the valid data, and erasing the data stored in the block to generate a new free block. The free block is a new block where data has been erased so that writing can be performed. In the case where the valid data are discarded, the compaction unit 64 may move the valid data except for the discarded data among the valid data.

The compaction enables a non-writable block to be a new writable block, so that a free block can be secured. In addition, if a page in which data is not yet written is included in the block where the valid data is written due to movement thereof, the page becomes a new writable page.

For example, although a write command is received from the host 10, the compaction is executed when the block in which data is to be written is insufficient. The timing when compaction is executed is not limited thereto. For example, the compaction may be executed when there is no request from the host 10 and when entering idle state.

The block to be subjected to the compaction can be selected according to an arbitrary method conventionally used. For example, a method of preferentially selecting a block having many invalid pages, a method of preferentially selecting a block having a long elapsed time after data writing, a method of selecting a block at random, or the like may be used.

In addition, as described later, if the discarding unit 65 has a function of erasing a block including only invalid data or discarded data, the compaction is unnecessary. In other words, the semiconductor memory device 50 may not include the compaction unit 64.

The discarding unit 65 may be configured to discard the data having the access count (reading access count) being equal to or smaller than a predetermined threshold value (second threshold value) and to allow the compaction unit 64 to perform compaction with respect to the data having the access count being larger than the second threshold value. In this case, a measurement unit for measuring the access count of the data may be further included. In this configuration, the data having a large access count (reading access count) can remain, so that the effect of a cache can be improved.

After data is written in the NAND 58, in the case where a predetermined condition is satisfied, the discarding unit 65 discards at least a portion of discardable data among the written data. The discarding unit 65 can determine whether or not the data are discardable, for example, based on the determination information of the LBA table.

The condition is arbitrary. For example, a condition that the number of free blocks is small, a condition that cost of the execution of compaction is high, or the like can be used.

In the case where a block including only the invalid data or the discarded data is obtained as a result of the discarding process, the discarding unit 65 may erase the block. In other words, in the case where all the valid data included in a block is discardable and all the discardable data is discarded, the discarding unit 62 may erase the block. With this configuration, it is possible to secure a writable area without the execution of compaction.

For example, in the case where the number of free blocks is smaller than a predetermined threshold value (third threshold value), the discarding unit 65 discards the data stored in the block where only the discardable data is stored, among the blocks excluding the free blocks. In addition, the discarding unit 65 erases the block from which data is discarded. For example, similarly to the compaction, the discarding unit 65 performs the erasing process by setting the values of all the bits constituting the block to "1".

In addition, in the case where the number of pieces of valid data stored in a block (block including invalid data) to be subjected to the compaction is larger than a predetermined threshold value (first threshold), the discarding unit 65 discards all or a portion of the valid data stored in the block. With this, it is possible to reduce the number of pieces of valid data which are to be moved through the compaction, and it is possible to reduce a load of the compaction.

In addition, in the case where an error occurs when the requested data is read, the discarding unit 65 discards the data in which the error occurs. With this, for example, it is possible to reduce an execution frequency of an error correction process at the occurrence of an error.

In this manner, the semiconductor memory device 50 according to the embodiment discards the stored data according to its own determination without instruction from the host 10. At this time, the semiconductor memory device 50 needs not notify the host 10 that the data is discarded. Therefore, in some cases, the host 10 does not know that the data is discarded and requests for reading the data. In the case where the reading of the discarded data is requested, the NAND controller 62 outputs the response indicating that the requested data may not be read to the host 10, so that the host 10 can know that the data is discarded. In addition, the response indicating that the requested data may not be read may be transmitted as a general reading error or as information which can be distinguished from the reading error. In the case where the response is transmitted as information which can be distinguished from the reading error, the host 10 can perform a process such as a process of avoiding retrying.

Figure 6:
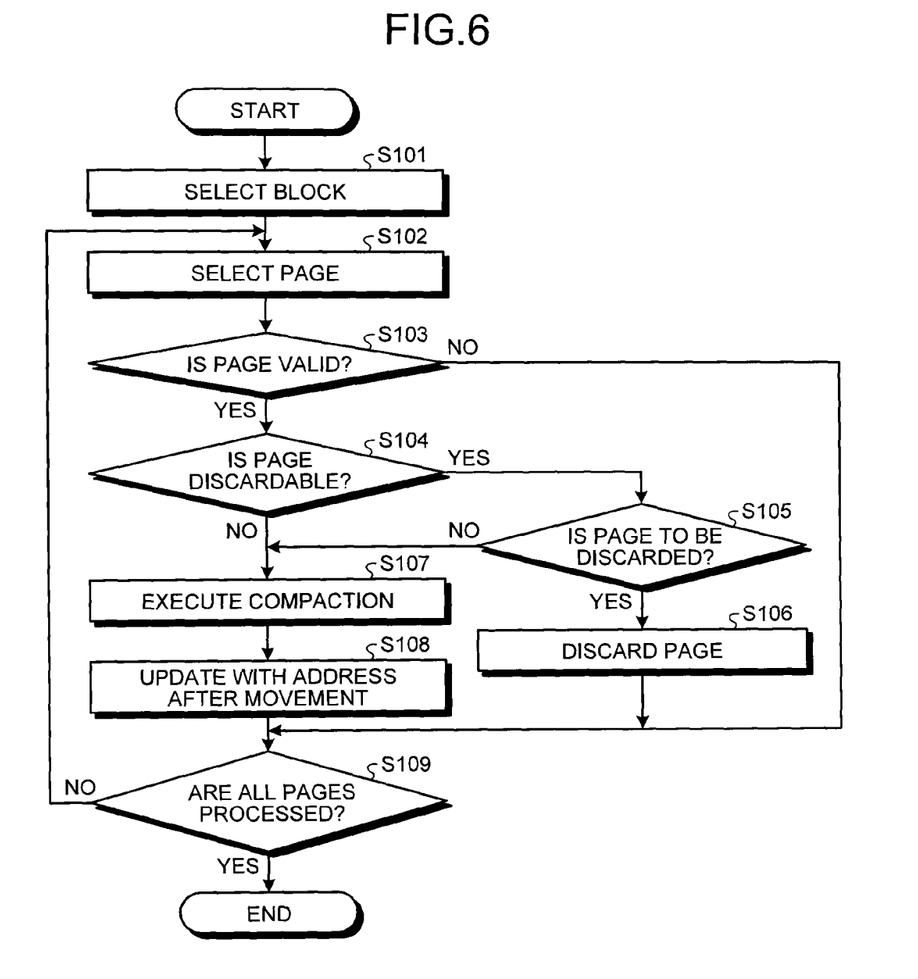
FIG. 6 is a flowchart illustrating a data discarding process according to the embodiment.

Next, a data discarding process of the semiconductor memory device 50 having the aforementioned configuration according to the embodiment is described with reference to FIG. 6. FIG. 6 is a flowchart illustrating the overall flow of the data discarding process according to the embodiment.

The data discarding process is performed by the discarding unit 65. Although the data discarding process may be performed at any timing, the data discarding process is performed, for example, when the compaction needs to be executed by the compaction unit 64.

The discarding unit 65 selects a block to be subjected to the determination as to whether or not the block is to be discarded (Step S101). For example, in the case where the data discarding process is performed at the time of execution of the compaction, the discarding unit 65 selects the block, which is selected as a target block of execution of the compaction, as a target block of the determination whether to discard the block.

The discarding unit 65 selects non-processed pages included in the selected block (Step S102). The method of selecting the page is arbitrary. For example, the discarding unit 65 selects the pages in the order from the leading page of the block. The discarding unit 65 determines whether or not the selected page is a valid page (Step S103). In the case where it is determined that the page is a valid page (Step S103: Yes), the discarding unit 65 determines whether or not the valid page is discardable (Step S104). The discarding unit 65 determines by using the determination information corresponding to the page number of the selected page with reference to, for example, the LBA table illustrated in FIG. 3 whether or not the valid page is discardable.

In the case where it is determined that the valid page is discardable (Yes in Step S104), the discarding unit 65 determines whether or not data of the valid page is to be actually discarded (Step S105). For example, in the case where the number of data discarded in the block exceeds a predetermined number, the discarding unit 65 determines that the data is not to be discarded. In addition, criterion of the determination is not limited thereto. Instead of performing this step, all the discardable pages (data) may be discarded.

In the case where it is determined that the valid page is to be discarded (Yes in Step S105), the discarding unit 65 discards the valid page (Step S106). For example, the discarding unit 65 updates the entry of the LBA table corresponding to the logic address of the valid page with information indicating that the data is discarded. For example, the discarding unit 65 updates the block number corresponding to the logic address of the valid page with a predetermined value indicating the data is discarded. Accordingly, for example, in the case where reading of the discarded data is requested from the host 10, the NAND controller 62 refers to the block number corresponding to the logic address of the requested data so as to know that the data has been discarded. In addition, the NAND controller 62 outputs a response indicating that the requested data may not be read through the host interface unit 60 to a requestor (host 10).

In the case where it is determined that the valid page is not to be discarded (No in Step S105) and in the case where it is determined that the valid page is undiscardable (No in Step S104), the compaction unit 64 moves the valid page into a free block (Step S107). The updating unit 63 updates the physical address of the LBA table with the physical address of the page to which the valid data is moved (Step S108).

In the case where it is determined that the page is not a valid page in Step S103 (No in Step S103), in the case where Step S106 is completed, and in the case where Step S108 is completed, the discarding unit 65 determines whether or not all the pages in the selected block are processed (Step S109). In the case where it is determined that all the pages in the selected block are not processed (No in Step S109), the process returns to Step S102 to repeat the process. In the case where it is determined that all the pages in the selected block are processed (Yes in Step S109), the data discarding process is ended.

MODIFIED EXAMPLE

In the above-described embodiment, an example in which discardable data (page) and undiscardable data (page) can be mixedly included in the same block has been described. In a modified example, the discardable data (page) and the undiscardable data (page) cannot be mixedly included in the same block.

Figure 7:
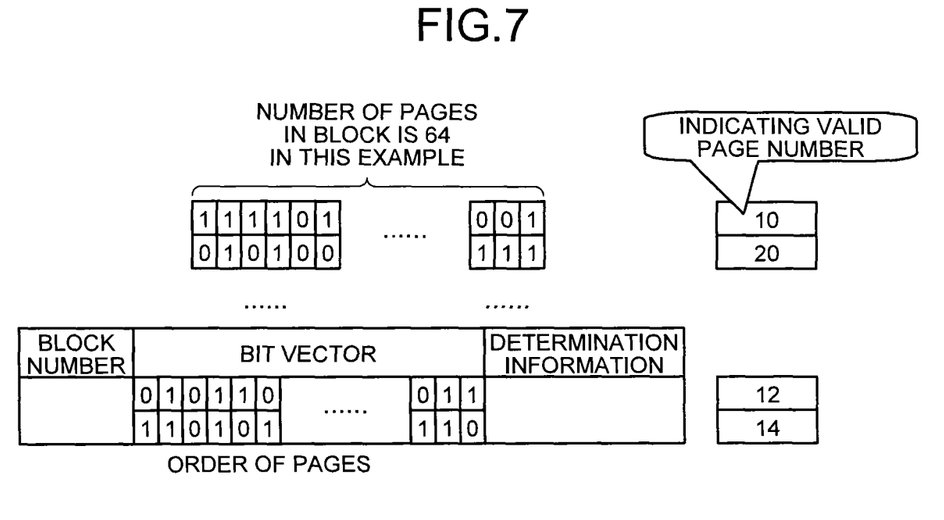
FIG. 7 is a diagram illustrating an example of a configuration of a bit vector table according to a modified example of the embodiment.

FIG. 7 is a diagram illustrating an example of a configuration of the bit vector table according to the modified example. In the modified example, the bit vector table stores therein determination information associated with the block number and the bit vector. In this manner, in the modified example, the determination information is stored not in units of a page but in units of a block. In addition, in the modified example, the determination information in the LBA table is unnecessary.

Besides the method of storing the determination information in the bit vector table, any method capable of determining whether data stored in a block is discardable or undiscardable may be used. For example, the determination information of each block may be stored in a table different from the bit vector table.

Figure 8:
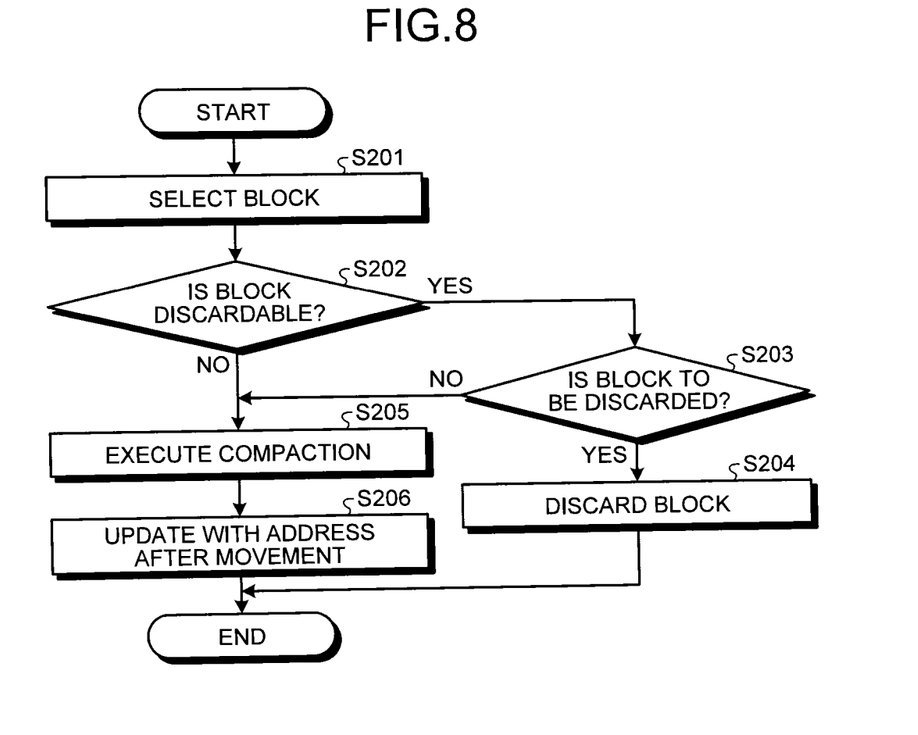
FIG. 8 is a flowchart illustrating a data discarding process according to a modified example of the embodiment.

Next, a data discarding process according to the modified example is described with reference to FIG. 8. FIG. 8 is a flowchart illustrating the overall flow of the data discarding process according to the modified example.

The discarding unit 65 selects a block to be subjected to the determination as to whether or not the block is to be discarded (Step S201). The discarding unit 65 determines whether or not the selected block is discardable (Step S202). The discarding unit 65 refers to the bit vector table illustrated, for example, in FIG. 7 and determines whether or not the block is discardable by using the determination information corresponding to the block number of the selected block.

In the case where it is determined that the block is discardable (Yes in Step S202), the discarding unit 65 determines whether or not the data of the block is to be actually discarded (Step S203). Instead of performing this step, all the discardable blocks (data) may be discarded.

In the case where it is determined that block is to be discarded (Yes in Step S203), the discarding unit 65 discards the block (Step S204). For example, the discarding unit 65 updates the entry of the LBA table corresponding to the logic address of each piece of data in the block with information indicating that the block is discarded.

In the case where it is determined that the block is not to be discarded (No in Step S203), and in the case where it is determined that the block is undiscardable (No in Step S202), the compaction unit 64 moves the valid page in the block to the free block (Step S205). The updating unit 63 updates the physical address of the LBA table with the physical address of the page to which the valid data is moved (Step S206), and the data discarding process is ended.

As described above, according to the embodiment, it is possible to discard data according to its own determination without instruction from a high level device (host). Accordingly, it is possible to reduce a load of compaction, an error correction process, or the like, and it is possible to implement a high speed process.

A program executed by a semiconductor memory device according to the embodiment is recorded in an installable format or an executable format in a computer-readable recording medium such as a CD-ROM (compact disk read only memory), a FD (flexible disk), a CD-R (compact disk recordable), or a DVD (digital versatile disk) and is provided as a computer program product.

In addition, a program executed by a semiconductor memory device according to the embodiment may be configured to be stored on a computer connected to a network such as the Internet and to be downloaded through the network so as to be provided. In addition, a program executed by a semiconductor memory device according to the embodiment may be configured to be provided or distributed through a network such as the Internet.

In addition, a program according to the embodiment may be configured to be assembled into a ROM or the like so as to be provided.

A program executed by the semiconductor memory device according to the embodiment is configured in a module including the aforementioned components, and a CPU 51 (processor) reads and executes the program from the aforementioned storage medium as actual hardware, so that the components are loaded on a main storage unit, and the components are generated on the main storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A semiconductor memory device comprising:
a semiconductor memory chip configured to store therein a plurality of pieces of data, the semiconductor memory chip being a chip in which data is written and from which data is read in units of a page that is a storage area having a predetermined size, and from which data is erased in
   units of a block including a plurality of pages;
a discarding unit configured to, after a piece of the plurality
   of pieces of the data is written in the semiconductor
   memory chip with a logic address being designated,
   discard at least a portion of valid data, which is the last
   data written in the same logic address, from among the
   plurality of pieces of data;
a compaction unit configured to write, in a second block,
   the valid data excluding the data discarded by the discarding unit from among the valid data stored in a first
   block and to erase the first block; and
a controller configured to output, in response to a request
   for reading the discarded data, a response indicating that
   the discarded data is unable to be read, wherein
in the case where all the valid data included in a given block
   are discarded, the discarding unit erases the given block.

2. The device according to claim 1, wherein in a case where a number of pieces of the valid data stored in the first block is larger than a predetermined threshold value, the discarding unit discards at least a portion of the valid data stored in the first block.

3. The device according to claim 1, wherein
the discarding unit discards the valid data having an access
   count to the valid data being equal to or smaller than a
   value, among the valid data, and
the compaction unit writes, in the second block, the valid
   data having the access count to the valid data being
   larger than the predetermined threshold value, among
   the valid data.

4. The device according to claim 1, wherein
the controller controls the storing in the block of first data
   indicating discardable data of the plurality of pieces of
   the data and second data indicating undiscardable data
   of the plurality of pieces of the data in such a manner that
   the first data and the second data are distinguished from
   each other,
in number of unused blocks in which data is not written is
   smaller than a value, the discarding unit discards the first
   data stored in the blocks in which only the first data are
   stored among the blocks excluding the unused blocks,
   and
the controller allocates, as a block in which data requested
   to be written is to be written, one of from which the first
   data is discarded and an unused block.

5. The device according to claim 1, wherein
the valid data includes first data and second data, the first
   data being discardable data, the second data being undiscardable data,
the controller controls the storing of the first data and the
   second data in the semiconductor memory chip in such a
   manner that the first data and the second data are distinguished from each other, and
the discarding unit discards at least a portion of the first
   data among a plurality of pieces of the first data.

6. The device according to claim 5, wherein the controller controls the storing in the semiconductor memory chip of, as the first data, discardable data requested to be written.

7. The device according to claim 5, further comprising a storage unit configured to store therein, with respect to each page, determination information indicating that the data stored in the page is either the first data or the second data.

8. The device according to claim 5, further comprising a storage unit configured to store therein, with respect to each block, determination information indicating that the data stored in the block is either the first data or the second data.

9. The device according to claim 5, wherein the controller controls the storing of the first data in a predetermined first range of a logic address range of the data and controls the storing of the second data in a predetermined second range of the logic address range.

10. The device according to claim 9, wherein the second range is equal to or smaller than a physical address range of the semiconductor memory chip.

11. The device according to claim 9, wherein the logic address range is larger than a physical address range of the semiconductor memory chip.

12. A computer program product comprising a non-transitory computer-readable medium containing a program, the program causing a semiconductor memory device including a semiconductor memory chip configured to store therein a plurality of pieces of data, the semiconductor memory chip being a chip in which the data is data is written and from which data is read in units of a page that is a storage area having a predetermined size, and in which data is erased in units of a block including a plurality of the pages, to execute:
   discarding, after a piece of the plurality of pieces of data is
      written in the semiconductor memory chip with a logic
      address being designated, at least a portion of valid data,
      which is the last data written in the same logic address,
      among the plurality of pieces of data;
   writing, in a second block, the valid data excluding the
      discarded data from among the valid data stored in a first
      block and erasing the first block; and
   outputting, in response to a request for reading the discarded data, a response indicating that the discarded data
      is unable to be read, wherein
   in the case where all the valid data included in a given block
      are discarded, the given block is erased.

13. The computer program product according to claim 12, wherein the discarding includes
   in a case where a number of pieces of the valid data stored
      in the first block is larger than a predetermined threshold
      value, discarding at least a portion of the valid data
      stored in the first block.

14. The computer program product according to claim 12, wherein
   the discarding includes
      discarding the valid data having an access count to the
         valid data being equal to or smaller than a predetermined threshold value, from among the valid data,
         and
   the writing includes
      writing, in the second block, the valid data having the
         access count to the valid data larger than the predetermined threshold threshold value, among the valid
         data.

15. The computer program product according to claim 12, wherein
   the valid data includes first data and second data, the first
      data being discardable data, the second data being undiscardable data;
   the program further causes a semiconductor memory
      device to execute:
      controlling storing of the first data and the second data in
         the semiconductor memory chip in such a manner that
         the first data and the second data are distinguished
         from each other; and
   the discarding includes
      discarding at least a portion of the first data from among
         a plurality of pieces of the first data.

16. The computer program product according to claim 15, wherein the controlling includes
controlling the storing in the semiconductor memory chip of, as the first data, discardable data requested to be written.

17. The computer program product according to claim 15, wherein
the controlling includes
controlling the storing of the first data indicating discardable data of the plurality of pieces of the data and controlling the storing of the second data indicating undiscardable data of the plurality of pieces of the data in the block in such a manner that the first data and the second data are distinguished from each other;
the discarding includes
in a case where a number of unused blocks in which data is not written is smaller than a predetermined threshold value, discarding the first data stored in the blocks in which only the first data is stored from among the blocks excluding the unused blocks, and
the controlling includes
allocating, as a block in which data requested to be written is to be written, one of a block from which the first data is discarded and an unused block.

18. The computer program product according to claim 15, wherein
the controlling includes
controlling the storing of the first data in a predetermined first range of a logic address range of the data and controlling the storing of the second data in a predetermined second range of the logic address range.

19. The computer program product according to claim 18, wherein the second range is equal to or smaller than a physical address range of the semiconductor memory chip.

20. The computer program product according to claim 18, wherein the logic address range is larger than a physical address range of the semiconductor memory chip.

\* \* \* \* \*